Nov. 25, 1952     H. SINGER ET AL     2,618,853
CENTERING DEVICE FOR USE IN DENTURE MANUFACTURE
Filed April 6, 1950                              2 SHEETS—SHEET 1
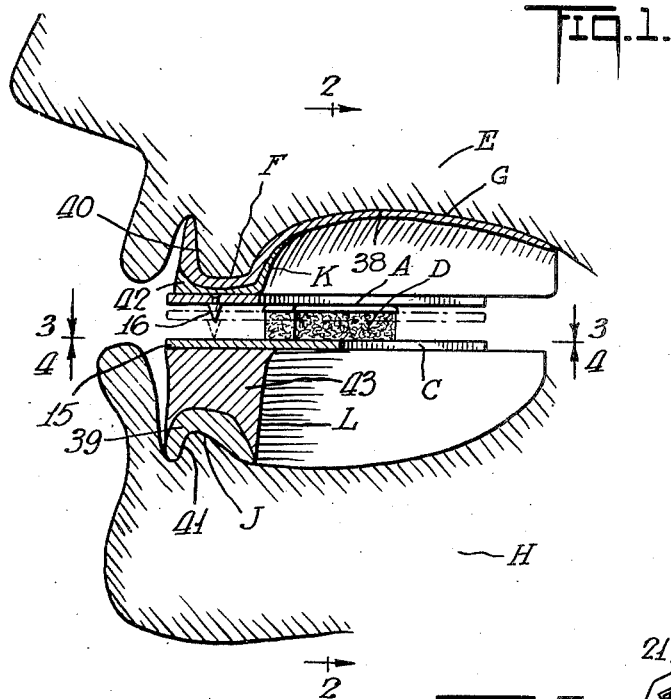
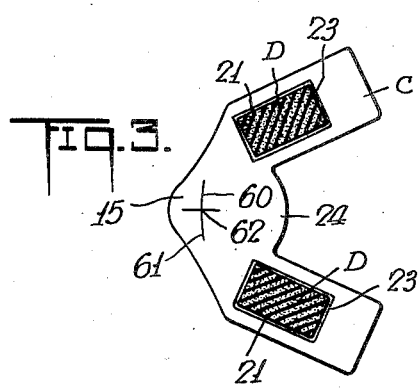
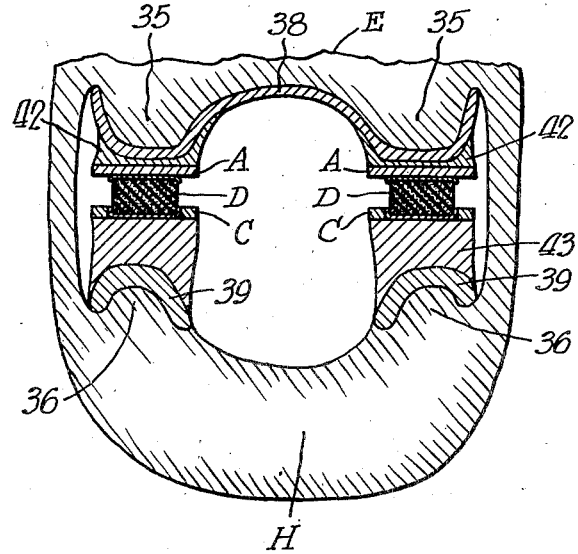
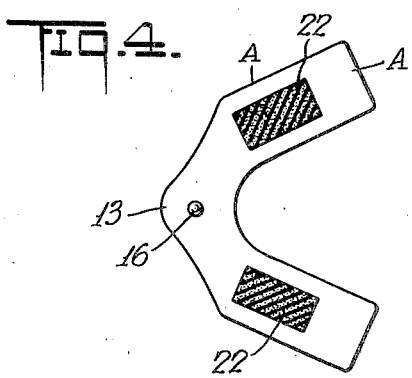
INVENTORS
HAROLD SINGER
MARCUS MARGARETTEN
LAWRENCE HANSEN
BY
ATTORNEY Nov. 25, 1952  H. SINGER ET AL  2,618,853
CENTERING DEVICE FOR USE IN DENTURE MANUFACTURE
Filed April 6, 1950  2 SHEETS—SHEET 2
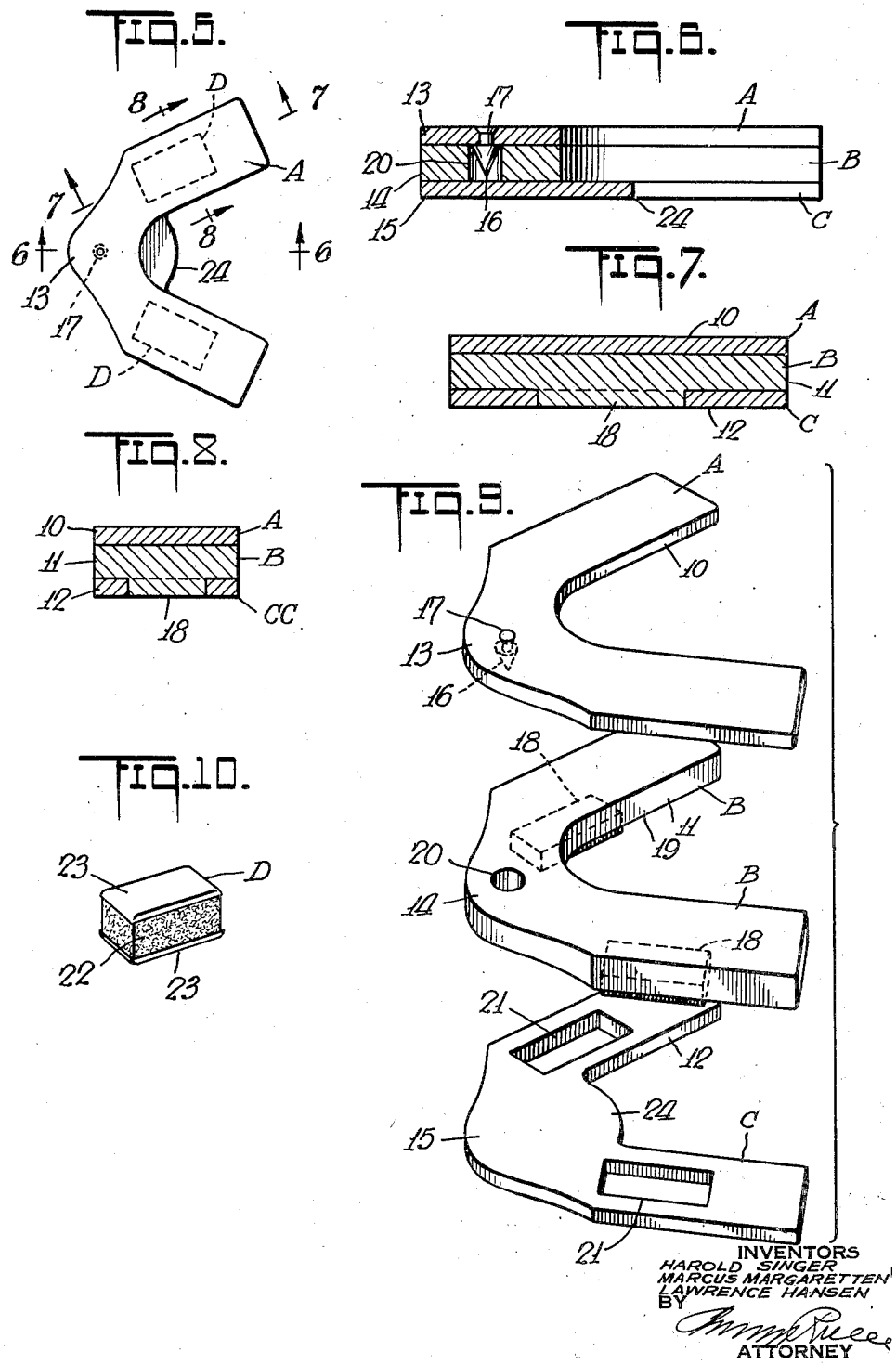

Patented Nov. 25, 1952

2,618,853

UNITED STATES PATENT OFFICE 2,618,853

CENTERING DEVICE FOR USE IN DENTURE MANUFACTURE

Harold Singer, Marcus Margaretten, and Lawrence Hansen, New York, N. Y.

Application April 6, 1950, Serial No. 154,282

9 Claims. (Cl. 32—19)

1

The present invention relates to the manufacture of dentures and particularly it relates to devices and apparatus used in the making of dentures.

Although not limited thereto, the present invention will be particularly described in its application to devices for assuring a correct bite of full upper and lower dentures.

In the making of artificial dentures, and particularly dentures requiring full upper and lower plates, the dentist as a first operation will place an impression material in the mouth to get the formation of the upper and lower gum face which are to support and receive the plate or denture in question.

A cast is then made of hard-setting material and this model is employed by the dentist or dental mechanic together with bite blocks to ascertain the amount of opening of the jaws of the person who is to receive the denture.

By means of these bite blocks, the opening of the upper and lower jaws may be set into an articulator which will simulate the opening and closing motion of the jaws of the person receiving the denture and which at all times will be provided with an adjustable stop which will be set in a limiting position corresponding to the jaw opening.

The present invention is particularly directed to the instrument or device which is employed to obtain the correct centering positions between the upper and lower jaws and to be certain that there will be correct and satisfactory alignment between the upper denture and the lower denture, when they have been completed and placed in the mouth.

The instrument itself consists of:

(1) an upper U-shaped plate with a projecting scribe or metal pin in the front of the instrument;

(2) a lower U-shaped plate with side recesses to receive the resilient blocks which keep the bite blocks closely against the gums without separation, and;

(3) an intermediate U-shaped plate serving as a jig having projecting blocks to fit into the recesses of the lower plate. The intermediate plate holds the upper and lower plates in their proper relationship to each other.

In applying the instrument of the present invention to the articulator having the cast formations of the upper and lower gums and adjacent mouth structure, a sheet of relatively hard, stiff, waxy or resinous material is applied to the upper and lower models simulating the gum and adjacent mouth surface, and then there is built up upon this base layer a softer, waxy or resinous material which simulates the dentures and tooth structure to subsequently form part of the upper and lower dentures.

The instrument consisting of the upper plate, the lower plate and the intermediate plate as a unit is then placed between the waxy or resinous material on the upper casting and the lower casting of the articulator and then is sealed into position.

The intermediate plate will have projecting blocks to fit into the recesses in the lower plate to keep such recesses free of wax during the mounting operation.

After the upper instrument plate has been sealed into position in the upper waxy or resinous material and the lower instrument plate has been sealed into position in the lower waxy or resinous material, these upper and lower instrument plates may be separated and the intermediate instrument plate removed.

These waxy and resinous formations may then be removed from the articulator and then fitted in the mouth of the patient as if they were dentures.

Flexible or rubber materials with metal caps are inserted in recesses in the lower instrument plate so as to give the impression of biting by the patient, and the patient is caused to close and move the same from side to side and forward and backward so as to obtain a Gothic arch tracing on the lower base by a stylus on the upper base. This will indicate the correct relationship of the upper and lower jaws.

A hole or recess is then drilled at the apex of the Gothic arch tracing on the lower base which indicates correct centric relationships. The patient then moves the jaw from side to side until the stylus on the upper plate engages the hole drilled through the lower plate, which will be the correct centric position.

When this is done, plaster will be inserted at the sides of the mouth to give two plaster index members. The base plates are then removed from the mouth, sealed together with these plaster indexes and then remounted upon the articulator. The dentures may then be made with the assurance that they will have the correct centric relationship.

It is among the objects of the present invention to devise a reliable, readily manufactured adaptable centering instrument of the character described, which may be readily used by dentists and dental mechanics and which will give assurance of maximum effectiveness in obtaining correct centric relationship of the upper and lower dentures in relation to each other.

Another object is to provide a novel and unique instrument of the character described which will be of great value to both dentists as well as dental mechanics in making upper and lower dentures and which will readily lend itself to present systems and procedures now in use.

Another object is to provide a centering instrument which will accurately measure and center the transverse and forward and readward motions of the jaws with respect to each other, which will give the correct character of the bite, which will assure that the tissue muscle of the mouth will function substantially in the normal manner, as upon chewing, and which will not be subject to derangement or malfunction because of separation of the gum-fitting elements from the rear of the gum or mouth structure during the measuring operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to the present invention, to form the instrument or device of three U-shaped plates, including an upper plate to be mounted upon the upper mouth portion, a lower plate to be mounted upon the lower mouth portion and a center plate for holding the two plates together.

The top or upper plate may consist of a thin sheet of metal with a pin projecting down from the forward portion thereof to cause a trace or scribe upon the lower plate. The bottom plate desirably receives the tracing or scribe, as the case may be, and although it may consist of metal of U-shape, it is desirably formed of a plastic which may be marked or scratched by the downwardly projecting pin of the upper or top plate.

The bottom plate also will have recesses at the sides thereof to receive resilient or flexible pads, which pads in one form of the invention may consist of thin blocks of rubber having metal facings so as to permit a forward or lateral backward sliding motion without locking of the upper plate and the lower plate of the instrument together.

The center plate, which is used for shipment, storage and to enable mounting, also to keep recesses of lower plate free of wax during mounting, desirably is of the same U-shape as the upper and lower plates and it has a forward opening to receive the pin of the upper plate and two side block shaped elements to be inserted into the recesses in the lower plate which receive the resilient pads.

With the foregoing and other objects in view, the invention consists of the novel construction, combination and arrangement of parts are hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side sectional view of the mouth structure of the person who is to be fitted with dentures, showing the location of the instrument therein.

Fig. 2 is a transverse sectional view upon the line 2—2 of Fig. 1.

Fig. 3 is a top plan view of the bottom or lower plate of the instrument, taken upon the line 3—3 of Fig. 1.

Fig. 4 is a bottom plan view of the upper plate of the instrument, taken upon the line 4—4 of Fig. 1.

Fig. 5 is a top plan view of the instrument with the three elements, namely the upper, intermediate and lower plates, mounted together.

Figs. 6, 7 and 8 are, respectively, transverse vertical sectional views upon the line 6—6, 7—7 and 8—8 of Fig. 5, upon an enlarged scale as compared to Fig. 5.

Fig. 9 is a perspective view of the three elements of the instrument of Fig. 5 separated from each other.

Fig. 10 is a side perspective view of the resilient metal-faced block for insertion into the lower instrument plate during the operation.

Referring to Figs. 5 to 9, the instrument consists of an upper plate A, a middle plate B and a lower plate C. The lower plate C is desirably of a soft metal or of a transparent or non-transparent plastic.

The plates A, B and C are of U-structure with legs 10, 11 and 12 and with forward portions 13, 14 and 15. The legs 10, 11 and 12 together with the forward portions 13, 14 and 15 will conform to the gum-line or be in about the same shape or dimension as the gum structure of the person who is to be fitted with the denture.

The forward portion of the plate A is desirably provided with a stylus 16, which may be provided with a riveted or screwed section 17 to the upper plate.

The middle plate B has the downwardly projecting lugs 18 on its lower face 19 to engage the lower plate C and it has a forward opening 20 to engage the pin 16.

The lower plate has the recesses 21 which receive the lugs 18 when the instrument is assembled, or which receive the rubber or resilient blocks D when the instrument is inserted into the mouth or used in connection with the making of dentures.

The blocks D consist of a central portion of resilient material, such as foam or sponge rubber 22, to which are attached the upper and lower slide plates 23 of a thin sheet metal, such as brass or aluminum.

The lower plate also has a rearwardly projecting section 24 which will strengthen the same and also act as a table for the tracing, but which will not project too far back to interfere with the tongue.

To use the instrument of Figs. 5 to 10, the dentist will first make an impression of the upper and lower jaws from which stone models are made of the gum face. These stone models are then used by the dentist together with bite blocks to ascertain the correct vertical dimension or amount of bite of the person to receive the dentures. These bite blocks together with the stone models are then mounted upon an articulator upon which the mouth opening or the jaw opening are set up by a screw adjustment.

In using the present instrument, the bite blocks are then removed from the stone models and new bases are mounted upon the stone models by first placing a shellac base and wax to the middle of the upper and lower gums, following which the base layer of shellac and wax is built up with a softer wax to the desired height to receive the instrument.

For example, by reference to Figs. 1 and 2, it will be noted that the upper jam E has a gum base F and a top mouth surface G while the lower jaw H has the gum structure J.

As will be noted in Fig. 2, these gum structures extend to the rear of the mouth, as indicated at 35, in connection with the upper jaw E, or at 36 as indicated at the lower jaw H, and before the operation, as indicated in Figs. 1 and 2, the stone models have already been made and the bite blocks have been mounted upon an articulator.

As is shown in Fig. 1, the base layer or sheet of shellac and wax, as indicated at 38, for the upper jaw E and at 39 for the lower jaw H have been molded onto stone models of the articulator to attain the correct form of the gum face, as indicated at 40, in connection with the upper jaw and 41 in connection with the lower jaw.

Upon these conformed sheets of shellac and wax 38 and 39 is mounted the softer wax mixture indicated at 42 and 43.

At this point the base wax and shellac sheets 38 and 39 of the built-up wax portions 42 and 43 are on the articulator and not in the mouth, as shown in Figs. 1 and 2. Then the three plates of the instrument A, B and C are sealed together by a sticky wax and the entire instrument is sealed to the upper wax structure 42 still on the articulator.

Then the instrument consisting of the three plates A, B and C is closed down upon the lower wax structure still on the articulator and as a result, both the upper plate A and the lower plate C will be embedded respectively to the wax structures 42 and 43, with the intermediate plate B in position.

After any excess wax 42 and 43 has been removed, the upper plate and the lower plate may be separated and the center plate removed. Then the rubber pads D are inserted and the complete structure, indicated by the letter K, may be removed from the articulator and fitted into the mouth against the upper jaw of the patient and the complete structure L may be removed from the articulator and fitted upon the lower jaw of the patient.

It will be noted that the upper structure K consists of the upper instrument plate A with the pin 16, the built-up wax portion 42 and the conforming wax and shellac plate 38.

The lower structure L consists of the lower plate C of plastic or soft metal, the resilient pads D, the built-up wax portion 43 as well as the conforming, lower base wax and shellac layer 39.

Then the patient will close his mouth, as indicated in Figs. 1 and 2, until the pin 16 will strike the forward portion of the lower plate at 15 and the patient is instructed to move his jaws sideways and forwardly and backwardly, with the result that two traces will be formed, 60 and 61, (see Fig. 3), having a center at 62, giving the correct center position of the upper jaw with respect to the lower jaw and with respect to the upper denture with respect to the lower denture. Then a hole or recess is drilled in the center of the Gothic arch.

Then before the structures L and K are removed from the mouth, the patient is caused to close his mouth and a soft plaster material is then placed at the sides of the structures K and L in closed position to give a plaster index by means of which the amount of separation of the plates A and C may be checked when the patient's mouth is closed and the amount of compression of the rubber block D may be subsequently ascertained.

As a last operation, the structures K and L are removed from the mouth of the patient, replaced on the articulator with the resilient pads D removed and the plaster indexes in position, and then articulated. The final dentures may be prepared, with the assurance that they will correctly fit the mouth and not require adjustment, re-formation or discomfort.

The rubber pads D will give a correct feel to the patient of his bite and at the same time these pads will not prevent lateral or forward and backward relative motion between the upper and lower instrument plates A and C. These rubber pads also will exert just enough pressure upon the upper and lower U-shaped base plates to assure their proper seating in the mouth.

The instrument as shown is particularly satisfactory to obtain correct centric relationship between the upper and lower jaws in an edentulous mouth where complete upper and lower dentures are to be made. It is, however, to be understood that it may also be used for either partial upper or lower dentures or where only one complete upper or lower denture is to be prepared.

Although the plates A, B and C may be made of a variety of shapes and materials, usually one or two different sizes will take care of most jaw structures.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A centering device for making dentures comprising an upper U-shaped plate, a lower U-shaped plate, said upper plate having a stylus at the front part thereof and said lower plate being of a soft material to receive a tracing from said stylus and said lower plate having openings at the sides thereof, resilient rubber blocks positioned at the sides of the device, said blocks being received in said side openings.

2. A centering device for making dentures comprising an upper U-shaped plate, a lower U-shaped plate, said upper plate having a stylus at the front part thereof and said lower plate being of a soft material to receive a tracing from said stylus and said lower plate having openings at the sides thereof, resilient rubber blocks positioned at the sides of the device, said blocks being received in said side openings, and an intermediate plate to lock said plates together in shipment, storage and mounting.

3. A centering device for making dentures comprising an upper U-shaped plate, a lower U-shaped plate, said upper plate having a stylus at the front part thereof and said lower plate being of a soft material to receive a tracing from said stylus and said lower plate having openings at the sides thereof, resilient rubber blocks positioned at the sides of the device, said blocks being received in said side openings, said blocks having upper and lower sheet metal facings serving as slip surfaces.

4. A centering device for making dentures comprising an upper U-shaped plate, a lower U-shaped plate, said upper plate having a stylus at the front part thereof and said lower plate being of a soft material to receive a tracing from said stylus and said lower plate having openings at the sides thereof, resilient rubber blocks positioned at the sides of the device, said blocks being received in said side openings, said blocks being of sponge rubber with upper and lower metal facings.

5. A centering device for making dentures comprising an upper U-shaped plate, a lower U-shaped plate, said upper plate having a stylus at the front part thereof and said lower plate being of a soft material to receive a tracing from said stylus and said lower plate having openings at the side thereof, resilient rubber blocks positioned at the sides of the device, said blocks being received in said side openings, and an intermediate plate to lock said plates together in shipment, storage and mounting, said intermediate plate having an opening to receive said stylus and cube shaped elements to fit onto and fill said openings in said lower plate, and to keep wax out of lower receptacles while mounting on articulator.

6. A dental instrument to obtain correct centering positions between the upper and lower jaws and to assure correct and satisfactory alignment between an upper artificial denture and a lower artificial denture when they have been completed and placed in the mouth, including an upper U-shaped plate with a front projecting scribe, a lower U-shaped plate with side recesses, side resilient rubber rectangular blocks in said recesses and an intermediate U-shaped plate serving as a jig carrying said blocks to fit into the recesses of the lower plate.

7. The instrument of claim 6, the axes of said blocks when extended forwardly intersecting at the front of the instrument adjacent said scribe.

8. The instrument of claim 6 in which the upper and lower faces of said blocks are provided with metal sheets to permit slippage between the plates.

9. An instrument to obtain correct centering positions between the upper and lower jaws and correct alignment between an upper denture and a lower denture comprising an upper U-shaped plate with a downwardly projecting central scribe at the front end of the plate, a lower U-shaped plate with side recesses to receive rubber blocks to be inserted in and extending through said recesses and an intermediate U-shaped plate serving as a jig provided with lugs projecting downwardly from its lower face to fit into said recesses.

HAROLD SINGER.
MARCUS MARGARETTEN.
LAWRENCE HANSEN.

REFERENCES CITED

The following references are of record in the file of this patent:

UNITED STATES PATENTS

| Number | Name | Date |
| --- | --- | --- |
| 2,507,118 | Opotow | May 9, 1950 |